(12) United States Patent
Iwashita et al.

(10) Patent No.: US 7,461,530 B2
(45) Date of Patent: Dec. 9, 2008

(54) DIE CUSHION MECHANISM, AND APPARATUS AND METHOD FOR CONTROLLING THE SAME

(75) Inventors: Yasusuke Iwashita, Fujiyoshida (JP); Tadashi Okita, Fujiyoshida (JP); Hiroyuki Kawamura, Yamanashi (JP); Satoshi Ikai, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 228 days.

(21) Appl. No.: 11/265,078

(22) Filed: Nov. 3, 2005

(65) Prior Publication Data

US 2006/0090656 A1    May 4, 2006

(30) Foreign Application Priority Data

Nov. 4, 2004  (JP) .............................. 2004-321311

(51) Int. Cl.
*B21C 51/00*   (2006.01)
(52) U.S. Cl. .................... 72/20.1; 72/20.2; 72/21.4; 72/443; 72/454
(58) Field of Classification Search ............ 72/17.1, 72/17.2, 20.1, 20.2, 20.4, 21.4, 31.01, 31.11, 72/350, 443, 446, 453.13, 454; 100/99
See application file for complete search history.

(56) References Cited

U.S. PATENT DOCUMENTS

| | | | | |
|---|---|---|---|---|
| 5,379,688 A | * | 1/1995 | Ishii | ............................ 100/35 |
| 5,435,166 A | * | 7/1995 | Sunada | ......................... 72/351 |
| 5,724,843 A | * | 3/1998 | Kirii et al. | .................... 72/17.2 |
| 7,143,617 B2 | * | 12/2006 | Futamura et al. | ............. 72/20.1 |
| 7,360,391 B2 | * | 4/2008 | Iwashita et al. | ............... 72/454 |
| 7,392,684 B2 | * | 7/2008 | Iwashita et al. | ............... 72/454 |

(Continued)

FOREIGN PATENT DOCUMENTS

EP    0 556 390 A1    5/1992

(Continued)

OTHER PUBLICATIONS

European Search Report mailed Mar. 12, 2008 issued in EP Application No. 05023984.

(Continued)

*Primary Examiner*—Edward Tolan
(74) *Attorney, Agent, or Firm*—Drinker Biddle & Reath LLP

(57) ABSTRACT

A control apparatus for controlling a die cushion mechanism including a servo-motor as a drive source and producing a force adapted to be applied to a slide in a press machine. The control apparatus includes a force commanding section for commanding a force to be produced by the die cushion mechanism; a force detecting section for detecting the force produced by the die cushion mechanism; a motor-speed detecting section for detecting an operating speed of the servo-motor; a slide-speed detecting section for detecting a moving speed of the slide; and a force controlling section for executing a force control on the servo-motor, based on a force command value commanded by the force commanding section, a force detected value detected by the force detecting section, a motor-speed detected value detected by the motor-speed detecting section and a slide-speed detected value detected by the slide-speed detecting section.

19 Claims, 6 Drawing Sheets

U.S. PATENT DOCUMENTS

| | | | |
|---|---|---|---|
| 7,401,492 B2 * | 7/2008 | Iwashita et al. | 72/454 |
| 2004/0170718 A1 | 9/2004 | Futamura et al. | |
| 2005/0274243 A1 * | 12/2005 | Shiroza et al. | 83/13 |
| 2006/0107724 A1 * | 5/2006 | Iwashita et al. | 72/351 |
| 2006/0288755 A1 * | 12/2006 | Iwashita et al. | 72/351 |

FOREIGN PATENT DOCUMENTS

| | | |
|---|---|---|
| GB | 2 022 866 A | 12/1979 |
| JP | 04-172200 | 6/1992 |
| JP | 05-007945 | 1/1993 |
| JP | 05-131295 | 5/1993 |
| JP | 10-202327 | 8/1998 |
| JP | 10-277799 | 10/1998 |

OTHER PUBLICATIONS

Japanese Notice of Reasons for Rejection dated Apr. 1, 2008 issued in JP Application No. 2004-321311 (including a partial translation thereof).

* cited by examiner

DIE CUSHION MECHANISM, AND APPARATUS AND METHOD FOR CONTROLLING THE SAME

BACKGROUND OF THE INVENTION

1. Field of the Invention

The present invention relates to a die cushion mechanism, and also to an apparatus and a method for controlling the die cushion mechanism.

2. Description of the Related Art

In a press machine for performing press working, such as bending, drawing, stamping, etc., it is known that a die cushion mechanism is provided as an auxiliary apparatus for applying, during a pressing operation, a required force (or pressure) to a movable support member (generally referred to as a slide) supporting a first die used for the press working, from the side of a second support member (generally referred to as a bolster) supporting a second die. The die cushion mechanism is usually constructed such that a movable element (generally referred to as a cushion pad) retained under a predetermined pressure is arranged to collide directly or indirectly with the slide (or the first die) moving in a die-closing direction and, after the collision, the cushion pad moves together with the slide while exerting a force (or pressure) to the slide, through the step of die-closing (or press forming) to the step of die-opening. During this procedure, it is possible, for example, to prevent a material to be pressed (or a workpiece) from being wrinkled, by sandwiching the peripheral region of the workpiece surrounding a pressed area between the cushion pad and the slide.

In order to improve the accuracy of the press working using the die cushion mechanism, it is required that the cushion pad stably applies a commanded force (or pressure) to the slide during a period when the cushion pad is moving together with the slide. However, as a conventional die cushion mechanism uses a hydraulic or pneumatic device as the drive source, it has generally been difficult to control the force (or pressure) applied to the slide so as to correspond to a command value in a variable mode, in response to a sudden pressure variation due to external causes, such as the collision with the slide, etc. Therefore, a die cushion mechanism including a servo-motor as a drive source has been recently developed, so as to achieve force control with an excellent performance in response.

For example, Japanese Unexamined Patent Publication (Kokai) No. 10-202327 (JP-A-10-202327) discloses a die cushion mechanism in which a cushion pad arranged beneath a slide of a press machine is vertically moved up and down by a servo-motor so as to correspond to the vertical motion of the slide. During a period when the slide is moved downward (i.e., during the pressing operation), and before the slide applies a collision force to the cushion pad, the servo-motor acts in accordance with a position control based on a position command for the cushion pad, so as to locate the cushion pad at a predetermined waiting position. Also, after the slide applies a collision force to the cushion pad, the servo-motor acts in accordance with a force control based on a force command previously determined to correspond to the position of the cushion pad, so as to move the cushion pad together with the slide and simultaneously adjust the force (or pressure) applied to the slide from the cushion pad. In this connection, the detection of collision and pressure is accomplished by detecting a load applied to the output shaft of the servo-motor through the cushion pad.

As described above, in the conventional die cushion mechanism using a servo-motor drive, the force (or pressure) applied to the slide from the cushion pad is suitably adjusted by changing the control scheme of the servo-motor from the position control to the force control at an instant when the slide exerts a collision force on the cushion pad. However, it is difficult, with only such a simple change of the control scheme, to properly control the force (or pressure) of the cushion pad quickly in response to a significant pressure fluctuation due to the impact of collision.

For example, in the case of the force control, the speed or torque of the servo-motor is ultimately controlled, so that a speed command to the servo-motor is always required, due to a speed feedback from the servo-motor that arises during the execution of the force control (i.e., during the movement of the cushion pad). Therefore, a compensator such as an integrator needs to be used to hold the speed command. However, the response of an integrator is generally not fast enough, and there may be a case that it is difficult to hold a proper speed command following a rapid fluctuation of the force at the time of collision. In this case, the overshoot of the force immediately after collision may become excessively large. Also, the position control is changed to the force control usually with a force command value of the force control being held at a certain value, so that, similar to the case of a step-like force command, a command for increasing the force is continuously issued during a period immediately after changing in which a force deviation (i.e., a difference between a force command value (or a desired value) and a force feedback value (or a detected value)) is large, and as a result, the force command value after collision tends to become excessively large. Thus, the force control for the servo-motor in the conventional die cushion mechanism has a problem that the overshoot of the force tends to become excessively large.

SUMMARY OF THE INVENTION

It is an object of the present invention to provide a control apparatus for a die cushion mechanism including a servo-motor as a drive source and producing a force adapted to be applied to a slide in a press machine, which is capable of solving the above-described problems associated with the execution of a force control, and which enables a required force to be properly produced in the die cushion mechanism with a superior performance in response.

It is another object of the present invention to provide a die cushion mechanism adapted to be incorporated in a press machine, which is capable of properly producing a required force with a superior controllable performance in response.

It is still another object of the present invention to provide a control method for a die cushion mechanism including a servo-motor as a drive source and producing a force adapted to be applied to a slide in a press machine, which is capable of solving the above-described problems associated with the execution of a force control, and which enables a required force to be properly produced in the die cushion mechanism with a superior performance in response.

To accomplish the above objects, the present invention provides a control apparatus for controlling a die cushion mechanism including a servo-motor as a drive source and producing a force adapted to be applied to a slide in a press machine, comprising a force commanding section for commanding a force to be produced by the die cushion mechanism; a force detecting section for detecting the force produced by the die cushion mechanism; a motor-speed detecting section for detecting an operating speed of the servo-motor; a slide-speed detecting section for detecting a moving speed of the slide; and a force controlling section for executing a force control on the servo-motor, based on a force command value commanded by the force commanding section, a force detected value detected by the force detecting section, a motor-speed detected value detected by the motor-speed detecting section and a slide-speed detected value detected by the slide-speed detecting section.

In the above control apparatus, the force controlling section may include a speed calculating section for calculating, from the force command value and the force detected value, a speed command value to be commanded to the servo-motor, and a speed controlling section for correcting the speed command value calculated by the speed calculating section by using the slide-speed detected value, and controlling the operating speed of the servo-motor based on the speed command value as corrected and the motor-speed detected value.

Also, the force commanding section may include a time-constant setting section for setting a rise time constant of the force command value. In this configuration, the force controlling section may include a time-constant adjusting section for adjusting the rise time constant set by the time-constant setting section, based on the slide-speed detected value detected by the slide-speed detecting section, and executes the force control based on the force command value including the rise time constant as adjusted.

Further, the force controlling section may include a speed controlling section for executing a preliminary acceleration control for starting the servo-motor before the die cushion mechanism produces the force and during a period when the slide moves. In this configuration, the control apparatus may further comprise a speed commanding section for commanding a preliminary-speed command value used for the preliminary acceleration control to the speed controlling section; and the speed controlling section may adjust the preliminary-speed command value commanded by the speed commanding section, based on the slide-speed detected value detected by the slide-speed detecting section.

The present invention further provides a die cushion mechanism incorporated into a press machine, and comprising a cushion pad movable correspondingly to a motion of a slide; a servo-motor for driving the cushion pad; a control apparatus for controlling the servo-motor and producing an correlative pressure between the cushion pad and the slide; wherein the control apparatus comprises a control apparatus as described in claim 1.

The present invention yet further provides a control method for controlling a die cushion mechanism including a servo-motor as a drive source and producing a force adapted to be applied to a slide in a press machine, comprising determining a force command value regarding a force to be produced by the die cushion mechanism; determining a force detected value regarding a force actually produced by the die cushion mechanism; determining an operating-speed detected value regarding an operating speed of the servo-motor; determining a moving-speed detected value regarding a moving speed of the slide; and executing a force control on the servo-motor, based on the force command value, the force detected value, the operating-speed detected value and the moving-speed detected value.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

Figure 1:
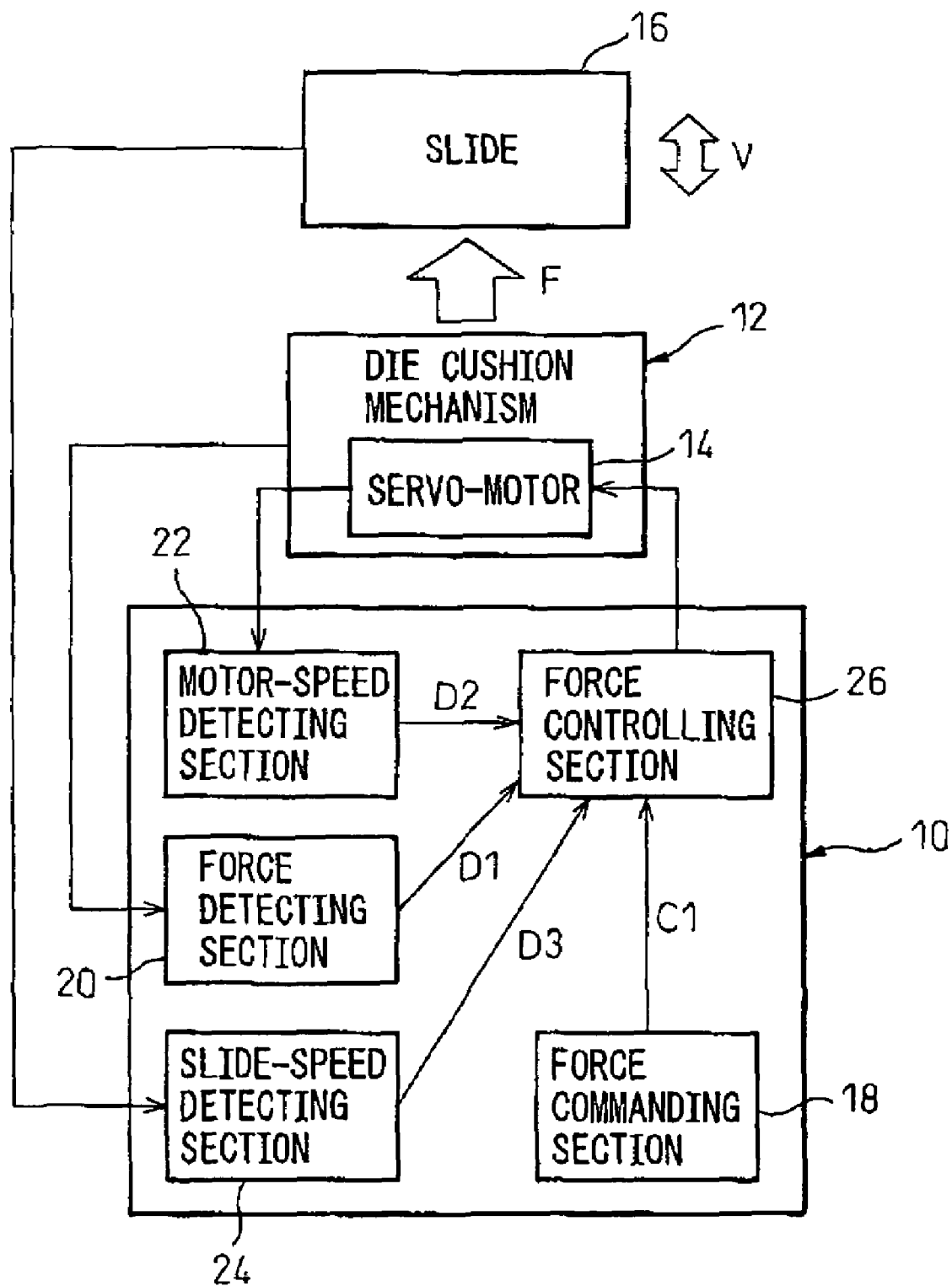
FIG. 1 is a functional block diagram showing a basic configuration of a control apparatus for a die cushion mechanism, according to the present invention.

The embodiments of the present invention are described below in detail, with reference to the accompanying drawings. In the drawings, the same or similar components are denoted by common reference numerals.

Figure 2:
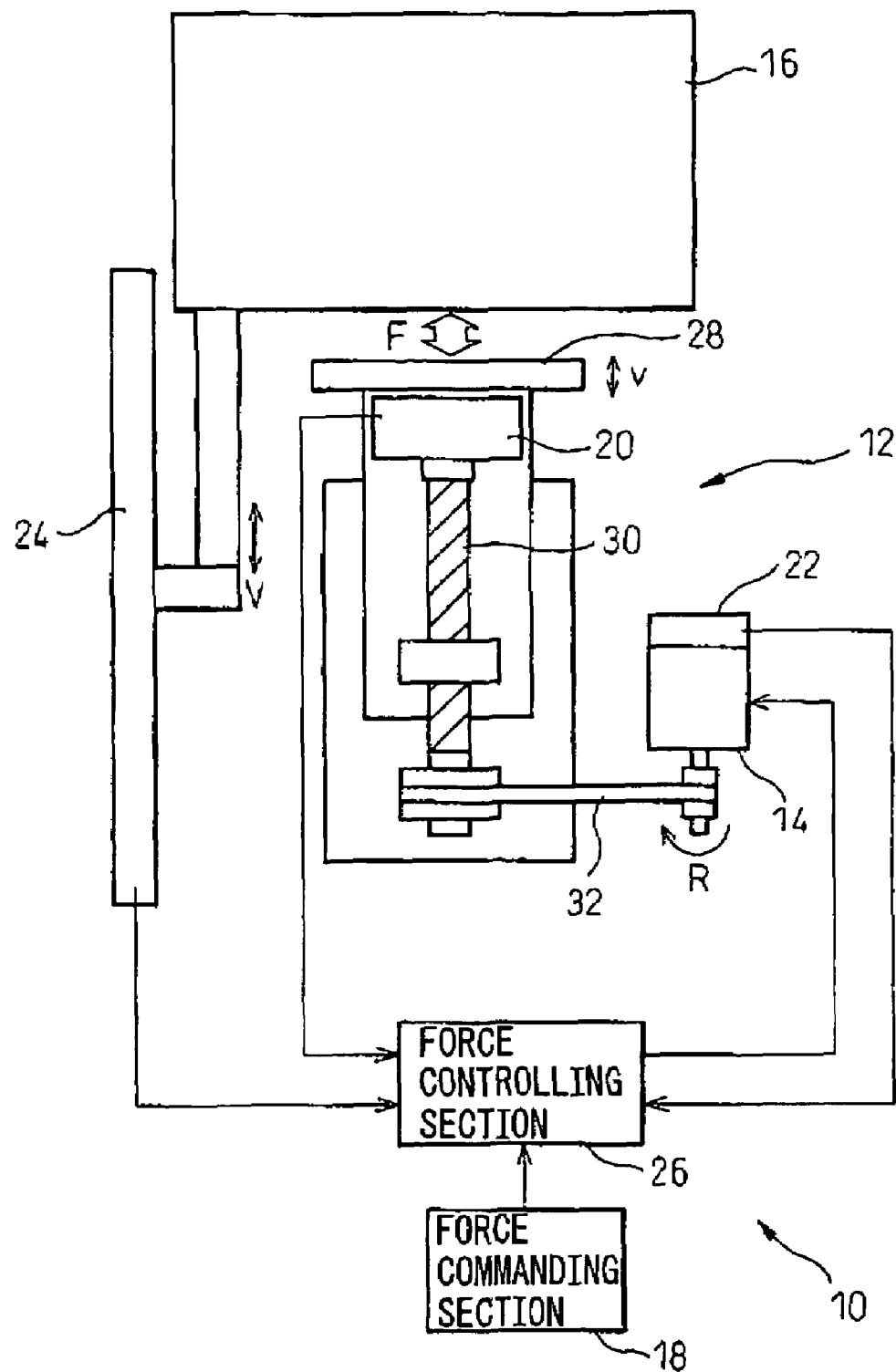
FIG. 2 is an illustration schematically showing a die cushion mechanism according to an embodiment of the present invention, which includes the control apparatus of FIG. 1.

Referring to the drawings, FIG. 1 is a functional block diagram showing the basic configuration of a control apparatus 10 according to the present invention, and FIG. 2 is a typical illustration showing the basic construction of a die cushion mechanism 12 according to an embodiment of the present invention including the control apparatus 10.

As shown in FIGS. 1 and 2, the control apparatus 10 according to the present invention has a configuration for controlling a die cushion mechanism 12 including a servo-motor 14 as a drive source and producing a force F adapted to be applied to a slide 16 in a press machine, and includes a force commanding section 18 for commanding a force F to be produced by the die cushion mechanism 12; a force detecting section 20 for detecting a force F produced by the die cushion mechanism 12; a motor-speed detecting section 22 for detecting the operating speed R of the servo-motor 14; a slide-speed detecting section 24 for detecting the moving speed V of the slide 16; and a force controlling section 26 for executing a force control on the servo-motor 14, on the basis of a force command value C1 commanded by the force commanding section 18, a force detected value D1 detected by the force detecting section 20, a motor-speed detected value D2 detected by the motor-speed detecting section 22 and a slide-speed detected value D3 detected by the slide-speed detecting section 24.

The die cushion mechanism 12 according to an embodiment of the present invention is an auxiliary apparatus incorporated into a press machine, and includes a cushion pad 28 moving in correspondence with the motion of the slide 16, a servo-motor 14 driving the cushion pad 28, and the control apparatus 10 controlling the servo-motor 14 to make it produce a correlative pressure (i.e., the force F) between the cushion pad 28 and the slide 16. The slide 16 supports a first die (not shown) used for a press working, and moves at a speed V required for a press working in a direction toward or away from a second die (not shown) supported on a not-shown bolster. The cushion pad 28 is arranged in association with the second die, and is connected through a ball screw unit 30 and a belt/pulley unit 32 to an output shaft of the servo-motor 14. The slide 16 (or the first die) collides directly or indirectly against the cushion pad 28 waiting at a predetermined position, during a period when the slide moves in a die-closing direction. Usually, through the step of die-closing (or press forming) to the step of die-opening, the cushion pad 28 moves together with the slide 16 while applying the required force (or pressure) F to the slide 16. In this connection, the force detecting section 20 may include a known force sensor, the motor-speed detecting section 22 may include a known encoder and the slide-speed detecting section 24 may include a known linear scale, respectively.

The control apparatus 10 having the above-described configuration can cause the servo-motor 14 to operate under a force control, on the basis of the force command value C1, the force detected value D1, the motor-speed detected value D2 and the slide-speed detected value D3, and thus can cause the cushion pad 28 to be moved accordingly. In this configuration, it is possible to solve the conventional problem, as already described, such that, during the execution of a force control (i.e., during the movement of the cushion pad 28), a force command value in the force control becomes excessively large due to a speed feedback value of the servo-motor 14 (i.e., the motor-speed detected value D2), by employing a speed feedback value of the slide 16 (i.e., the slide-speed detected value D3) moving in association with the cushion pad 28 in the force control. In other words, by a configuration in which the force controlling section 26 possesses information (especially, speed information) on both the slide 16 and the cushion pad 28 cooperatively operate during a press working, it is possible to improve compliance in the cooperative operation. As a result, according to the control apparatus 10, it is possible to make the die cushion mechanism 12 properly produce the force F required for the press working with a superior performance in response.

Also, the die cushion mechanism 12 incorporated into the press machine is capable of properly producing a required force with a superior controllable performance in response. In this connection, such a characteristic operative effect obtained by the control apparatus 10 is effective in a configuration wherein the control mode of the servo-motor 14 is changed from the position control to the force control at an instant when the slide 16 collides against the cushion pad 28, as described in JP-A-10-202327, in a point as to solve the problems of the force control after changing the control mode. The present invention is not limited to this application, however, and the particular operative effect of the control apparatus 10 may also be obtained in a configuration wherein the servo-motor 14 is operated only by the force control and not by the position control, such as a conventional die cushion mechanism using a hydraulic or pneumatic device as a drive source.

The above-described configuration of the control apparatus 10 may also be described as a control method as follows: a method for controlling a die cushion mechanism 12 including a servo-motor 14 as a drive source and producing a force F adapted to be applied to a slide 16 in a press machine, the method including the steps of determining a command value C1 regarding a force F to be produced in the die cushion mechanism 12; determining a detected value D1 regarding a force F actually produced by the die cushion mechanism 12; determining a detected value D2 regarding an operating speed R of the servo-motor 14; determining a detected value D3 regarding a moving speed V of the slide 16; and executing a force control on the servo-motor 14 on the basis of the command value C1 of the force F, the detected value D1 of the force F, the detected value D2 of the operating speed R and the detected value D3 of the moving speed V. The above-described particular operative effect can be obtained by executing this control method.

More concrete configurations, wherein the slide-speed detected value D3 is used as the feedback value in the force control, will be described below in connection with some preferred embodiments of the present invention. Each of these embodiments has the basic construction of the control apparatus 10 as described above, so that corresponding components are denoted by common reference numerals or symbols and the explanations thereof are not repeated.

Figure 3:
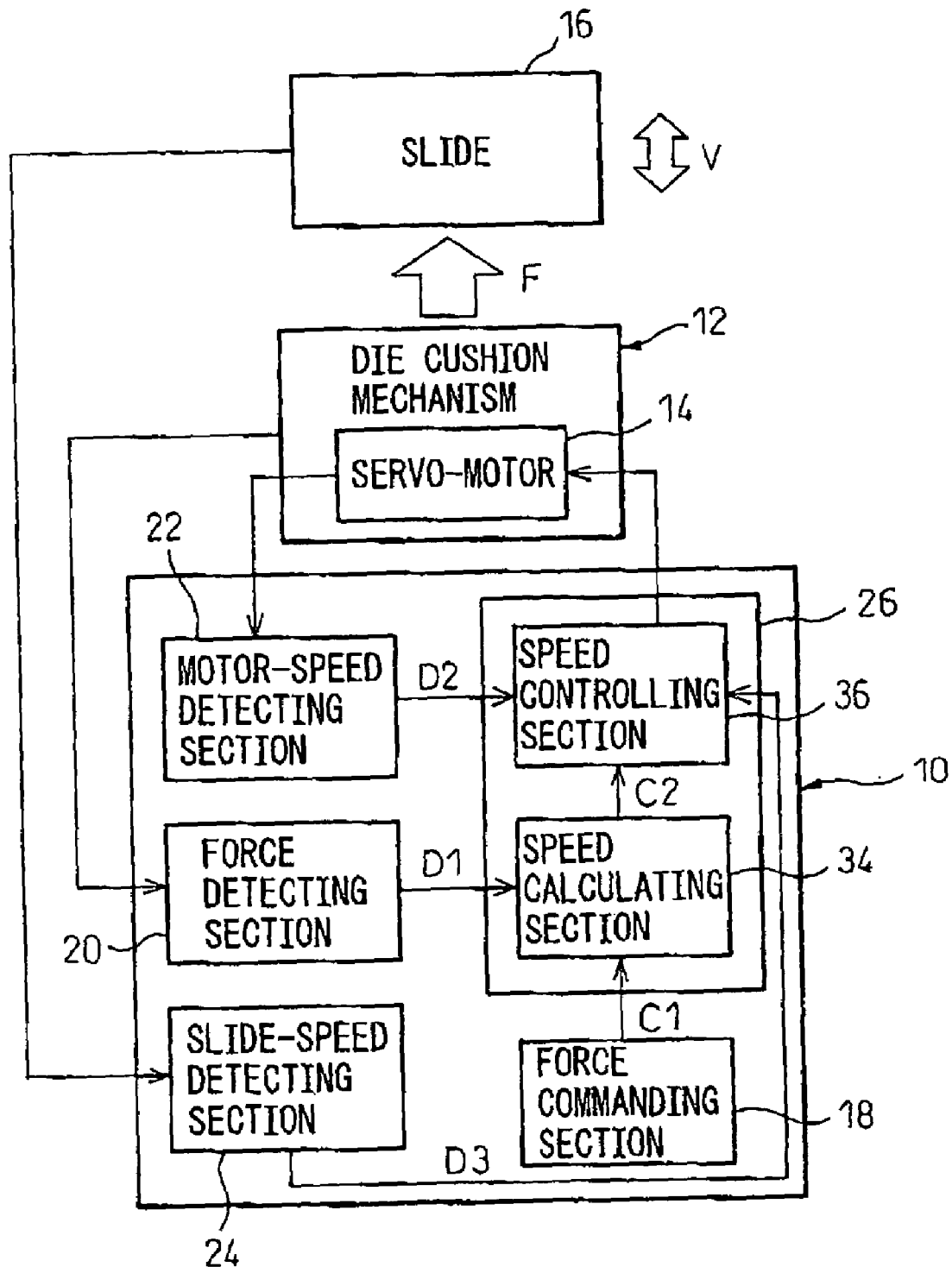
FIG. 3 is a functional block diagram showing a control apparatus according to a first embodiment of the present invention.

In a control apparatus 10 according to a first embodiment shown in FIG. 3, the force controlling section 26 includes a speed calculating section 34 for calculating, from the force command value C1 and the force detected value D1, a speed command value C2 to be commanded to the servo-motor 14; and a speed controlling section 36 for correcting the speed command value C2 calculated by the speed calculating section 34 by using the slide-speed detected value D3, and controlling the operating speed R of the servo-motor 14 based on the corrected speed command value and the motor-speed detected value D2 (i.e., subtracting the operating speed feedback value of the servo-motor 14 from the speed command value after being corrected). Thus, the force controlling section 26 executes the force control by controlling the operating speed R of the servo-motor 14. In this connection, it is advantageous that the speed controlling section 36 corrects the speed command value C2 by adding the slide-speed detected value D3 to the speed command value C2 calculated by the speed calculating section 34.

According to this configuration, in the speed loop of the force control, it is possible to reduce the influence of the motor-speed detected value D2 by using the slide-speed detected value D3 for the correction of the speed command value. Thereby, it is possible to effectively reduce the overshoot of the force in the force control. In particular, if the speed command value is corrected by the addition of the slide-speed detected value D3, it is possible to quickly and properly correct the speed command value immediately after collision, and to move the die cushion mechanism so as to accurately follow the slide during a steady state. Thus, it is possible to execute the force control with a significant performance in response, such as to diminish a force deviation toward zero as quickly as possible. This control procedure is particularly effective in a situation where the moving speed "v" of the cushion pad 28 (FIG. 2) is brought into identical to the moving speed "V" of the slide 16, after the slide 16 collides against the cushion pad 28.

Figure 4:
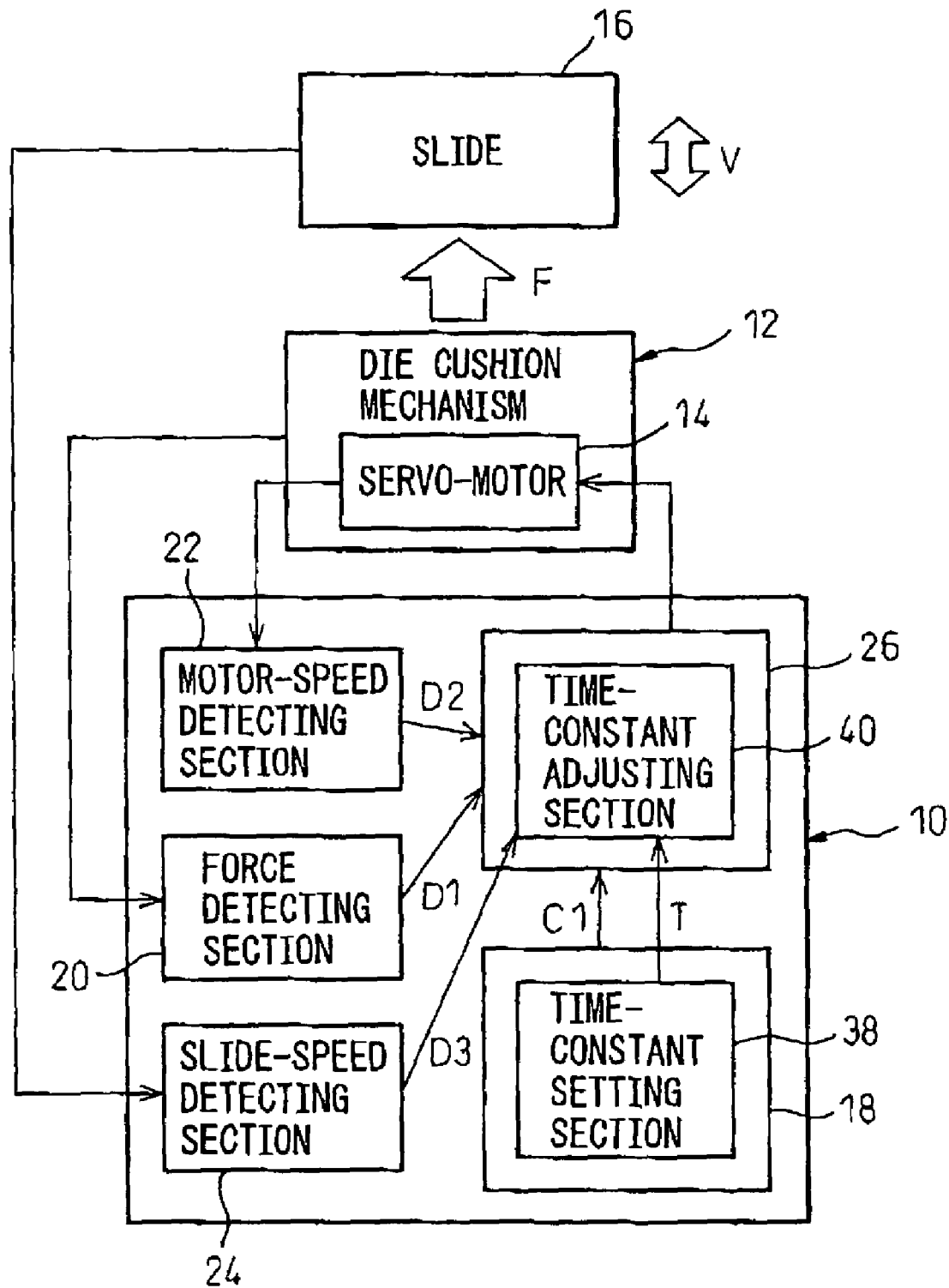
FIG. 4 is a functional block diagram showing a control apparatus according to a second embodiment of the present invention.

In the control apparatus 10 according to a second embodiment shown in FIG. 4, the force commanding section 18 includes a time-constant setting section 38 for setting a rise time constant T of the force command value C1. Also, the force controlling section 26 includes a time-constant adjusting section 40 for adjusting the rise time constant T set by the time-constant setting section, on the basis of the slide-speed detected value D3 detected by the slide-speed detecting section 34. Thus, the force controlling section 26 executes the force control on the basis of the force command value C1 including the rise time constant T adjusted by the time-constant adjusting section 40.

If the force control is not based on a step-like force command but is based on the force command value C1 including the desired rise time constant T, the force deviation at the initial stage of control is diminished, so that the overshoot of the force can be effectively reduced. Further, in the above configuration, the rise time constant T is adjusted based on the slide-speed detected value D3, so that it is possible to execute the stable force control on the basis of the force command value C1 with an optimum rise corresponding to the actual moving speed V of the slide 16.

Incidentally, the die cushion mechanism 12 may be configured such that the cushion pad 28 is caused to move in a preliminary acceleration (i.e., a preparatory running) just before collision, so as to reduce the collision impact at the time of collision of the slide 16 against the cushion pad 28

(FIG. 2). In this configuration, a significant advantageous operative effect can also be obtained by the above-described approach of adjusting the rise time constant in the second embodiment.

Figure 5:
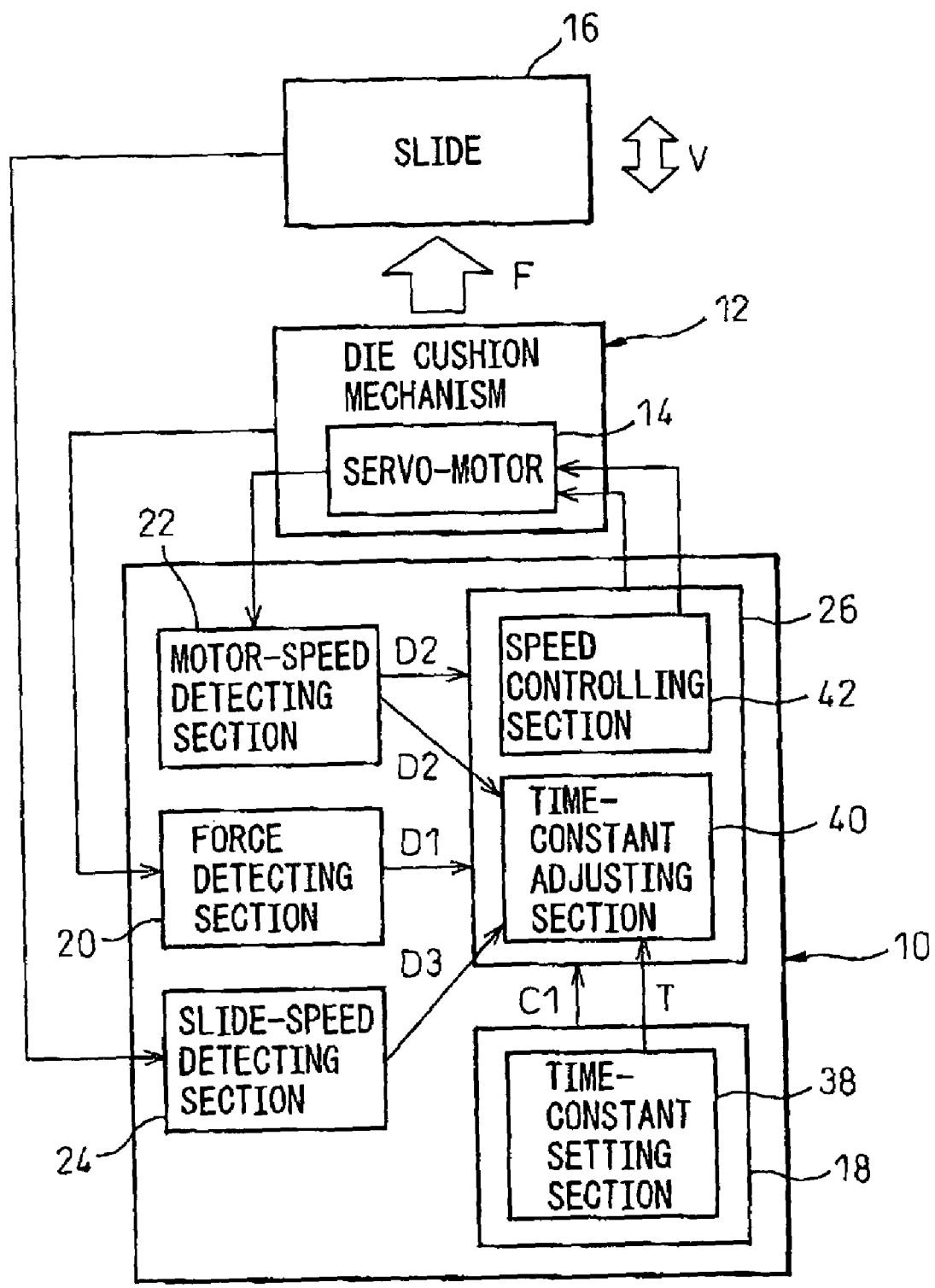
FIG. 5 is a functional block diagram showing a modified control apparatus.

In this configuration, as shown in FIG. 5 as a modification, the force controlling section 26 includes a speed controlling section 42 for executing a preliminary acceleration control for starting the servo-motor 14 during the movement of the slide 16 and before the die cushion mechanism 12 produces the force F. The time-constant adjusting section 40 adjusts the rise time constant T, during a period when the speed controlling section 42 executes the preliminary acceleration control, on the basis of the motor-speed detected value D2 detected by the motor-speed detecting section 22 and the slide-speed detected value D3 detected by the slide-speed detecting section 24. Thereby, during a preliminary acceleration operation of the cushion pad 28, it is possible to execute the stable force control on the basis of the force command value C1 with an optimum rise corresponding to the actual moving speeds V, v of the slide 16 and cushion pad 28.

In the above-described second embodiment, it is advantageous that the time-constant adjusting section 40 adjusts the rise time constant T on the basis of a difference (D3−D2) between the motor-speed detected value D2 and the slide-speed detected value D3. Thereby, it is possible to use the force command value C1 with an optimum rise corresponding to a relative moving speed between the slide 16 and cushion pad 28. In this case, it is desirable that the time-constant adjusting section 40 adjusts the rise time constant T in such a manner that, as the difference (D2−D3) between the motor-speed detected value D2 and the slide-speed detected value D3 becomes large, the rise time constant T decreases more and more. Thereby, it is possible to more quickly relieve a large impact force at the time of collision of the slide 16 against the cushion pad 28, so as to obtain the required force F. In this connection, if the preliminary acceleration control is not executed, the motor-speed detected value D2=0.

Figure 6:
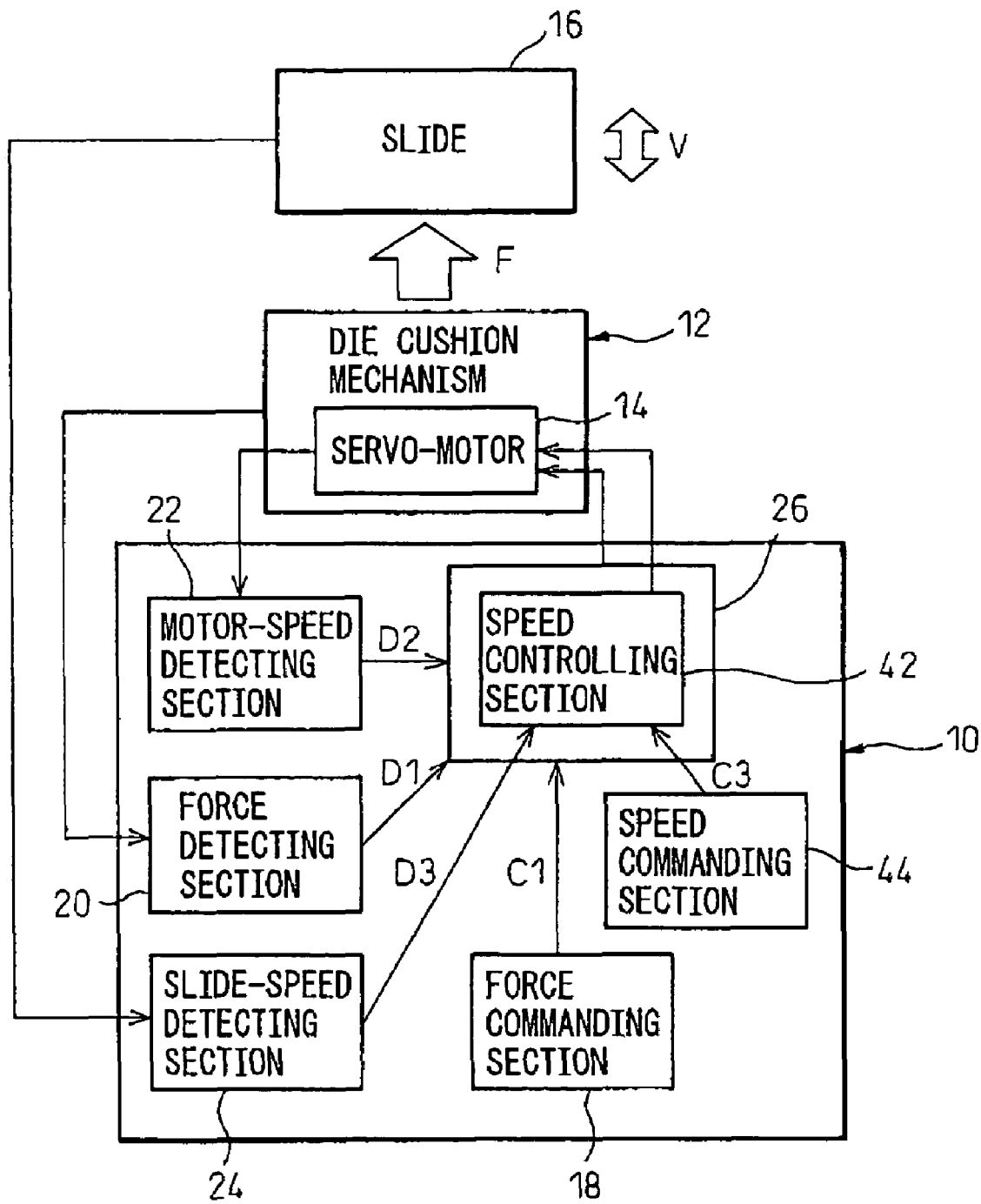
FIG. 6 is a functional block diagram showing a control apparatus according to a third embodiment of the present invention.

The control apparatus 10 according to a third embodiment shown in FIG. 6 is particularly effective in the configuration wherein the cushion pad 28 is operated in a preliminary acceleration motion just before collision. In this embodiment, the control apparatus 10 further includes a speed commanding section 44 for commanding a preliminary-speed command value C3 used for the above-described preliminary acceleration control to the speed controlling section 42 of the force controlling section 26. The speed controlling section 42 adjusts the preliminary-speed command value C3 commanded by the speed commanding section 44 on the basis of the slide-speed detected value D3 detected by the slide-speed detecting section 24. Thereby, when the cushion pad 28 is moved in the preliminary acceleration, it is possible to start the servo-motor 14 at an optimum preliminary speed v corresponding to the actual moving speed V of the slide 16.

In the third embodiment described above, it is advantageous that the speed controlling section 42 adjusts the preliminary-speed command value C3 in such a manner that the preliminary-speed command value C3 is proportional to the slide-speed detected value D3. It is thereby possible to start the servo-motor 14 at a preliminary speed v accurately corresponding to the actual moving speed V of the slide 16.

It should be noted that the preliminary acceleration control described in association with the second and third embodiments is generally executed by a position control based on a position command value for commanding the position of the cushion pad 28 (i.e., the operating position of the servo-motor 14). In other words, the servo-motor 14 operates under the position control during the preliminary acceleration motion of the cushion pad 28 (i.e., before the slide 16 collides against the cushion pad 28), and operates under the force control, changed from the position control, after the slide 16 collides against the cushion pad 28. In this case, in each of the above embodiments, the speed controlling section 42 provided in the force controlling section 26 for the preliminary acceleration control actually executes the motor speed control in a position control mode. Therefore, the preliminary-speed command value C3 commanded by the speed commanding section 44 in the third embodiment is the speed command value obtained at the final stage of the position control.

However, in the preliminary acceleration control, it is also possible to eliminate such a position control, and to execute the motor speed control in a force control mode inherently executed by the force controlling section 26, by directly inputting the preliminary-speed command value C3 into the speed controlling section 42. In this case, it is advisable to sense the approach of the slide 16 toward the cushion pad 28 by a proximity sensor or the like, and to start the preliminary acceleration control by the force control mode at a predetermined timing.

Although the configuration of each of the above-described first to third embodiments ensures a particular operative effect by itself, it is to be understood that two or more of the embodiments can be combined for use, which ensures a more remarkable operative effect.

While the invention has been described with reference to specific preferred embodiments, it will be understood by those skilled in the art that various changes and modifications may be made thereto without departing from the scope of the following claims.

The invention claimed is:

1. A control apparatus for controlling a die cushion mechanism including a servo-motor as a drive source and producing a force adapted to be applied to a slide in a press machine, comprising:
   a force commanding section for commanding a force to be produced by said die cushion mechanism;
   a force detecting section for detecting said force produced by said die cushion mechanism;
   a motor-speed detecting section for detecting an operating speed of said servo-motor;
   a slide-speed detecting section for detecting a moving speed of said slide; and
   a force controlling section for executing a force control on said servo-motor, based on a force command value commanded by said force commanding section, a force detected value detected by said force detecting section, a motor-speed detected value detected by said motor-speed detecting section and a slide-speed detected value detected by said slide-speed detecting section.

2. A control apparatus as set forth in claim 1, wherein said force controlling section includes a speed calculating section for calculating, from said force command value and said force detected value, a speed command value to be commanded to said servo-motor, and a speed controlling section for correcting said speed command value calculated by said speed calculating section by using said slide-speed detected value, and controlling said operating speed of said servo-motor based on said speed command value as corrected and said motor-speed detected value.

3. A control apparatus as set forth in claim 2, wherein said speed controlling section corrects said speed command value calculated by said speed calculating section by adding said slide-speed detected value to said speed command value.

4. A control apparatus as set forth in claim 1, wherein said force commanding section includes a time-constant setting section for setting a rise time constant of said force command value; and wherein said force controlling section includes a time-constant adjusting section for adjusting said rise time constant set by said time-constant setting section, based on said slide-speed detected value detected by said slide-speed detecting section, and executes said force control based on said force command value including said rise time constant as adjusted.

5. A control apparatus as set forth in claim 4, wherein said force controlling section includes a speed controlling section for executing a preliminary acceleration control for starting said servo-motor before said die cushion mechanism produces said force and during a period when said slide moves; and wherein said time-constant setting section adjusts said rise time constant, during a period when said speed controlling section executes said preliminary acceleration control, based on said motor-speed detected value detected by said motor-speed detecting section and said slide-speed detected value detected by said slide speed detecting section.

6. A control apparatus as set forth in claim 4, wherein said time-constant adjusting section adjusts said rise time constant based on a difference between said motor-speed detected value and said slide-speed detected value.

7. A control apparatus as set forth in claim 6, wherein said time-constant adjusting section adjusts said rise time constant in such a manner that, as said difference between said motor-speed detected value and said slide-speed detected value becomes large, said rise time constant decreases.

8. A control apparatus as set forth in claim 1, wherein said force controlling section includes a speed controlling section for executing a preliminary acceleration control for starting said servo-motor before said die cushion mechanism produces said force and during a period when said slide moves; wherein said control apparatus further comprises a speed commanding section for commanding a preliminary-speed command value used for said preliminary acceleration control to said speed controlling section; and wherein said speed controlling section adjusts said preliminary-speed command value commanded by said speed commanding section, based on said slide-speed detected value detected by said slide-speed detecting section.

9. A control apparatus as set forth in claim 8, wherein said speed controlling section adjusts said preliminary-speed command value in such a manner that said preliminary-speed command value is proportional to said slide-speed detected value.

10. A die cushion mechanism incorporated into a press machine, comprising:
   a cushion pad movable in correspondence with a motion of a slide;
   a servo-motor for driving said cushion pad;
   a control apparatus for controlling said servo-motor and producing an correlative pressure between said cushion pad and said slide;
   wherein said control apparatus comprises a control apparatus as described in claim 1.

11. A control method for controlling a die cushion mechanism including a servo-motor as a drive source and producing a force adapted to be applied to a slide in a press machine, comprising:

determining a force command value regarding a force to be produced by said die cushion mechanism;
   determining a force detected value regarding a force actually produced by said die cushion mechanism;
   determining an operating-speed detected value regarding an operating speed of said servo-motor;
   determining a moving-speed detected value regarding a moving speed of said slide; and
   executing a force control on said servo-motor, based on said force command value, said force detected value, said operating-speed detected value and said moving-speed detected value.

12. A control method as set forth in claim 11, wherein the step of executing a force control includes calculating, from said force command value and said force detected value, a speed command value to be commanded to said servo-motor, correcting said speed command value by using said moving-speed detected value, and controlling said operating speed of said servo-motor based on said speed command value as corrected and said operating-speed detected value.

13. A control method as set forth in claim 12, wherein said speed command value as calculated is corrected by adding said moving-speed detected value to said speed command value.

14. A control method as set forth in claim 11, wherein the step of executing a force control includes setting a rise time constant of said force command value, and adjusting said rise time constant based on said moving-speed detected value, so as to execute said force control based on said force command value including said rise time constant as adjusted.

15. A control method as set forth in claim 14, wherein a preliminary acceleration control for starting said servo-motor before said die cushion mechanism produces said force and during a period when said slide moves is executed; and wherein said rise time constant is adjusted, during said preliminary acceleration control, based on said operating-speed detected value and said moving-speed detected value.

16. A control method as set forth in claim 14, wherein said rise time constant is adjusted based on a difference between said operating-speed detected value and said moving-speed detected value.

17. A control method as set forth in claim 16, wherein said rise time constant is adjusted in such a manner that, as said difference between said operating-speed detected value and said moving-speed detected value becomes large, said rise time constant decreases.

18. A control method as set forth in claim 11, further comprising executing a preliminary acceleration control for starting said servo-motor before said die cushion mechanism produces said force and during a period when said slide moves, and adjusting a preliminary-speed command value used for said preliminary acceleration control, during said preliminary acceleration control, based on said moving-speed detected value.

19. A control method as set forth in claim 18, wherein said preliminary-speed command value is adjusted in such a manner that said preliminary-speed command value is proportional to said moving-speed detected value.

* * * * *